US012573922B2

(12) United States Patent
Matthey et al.

(10) Patent No.: US 12,573,922 B2
(45) Date of Patent: Mar. 10, 2026

(54) COLLECTION DEVICE FOR COLLECTING ELECTRICAL CURRENTS, AND MACHINE COMPRISING A COLLECTION DEVICE OF THIS KIND

(71) Applicant: SCHUNK CARBON TECHNOLOGY GMBH, Bad Goisern (AT)

(72) Inventors: Stephen Matthey, Abersee (AT);
Marco Etzlstorfer, Bad Goisern (AT);
Joachim Kurz, Bad Goisern (AT);
Florian Huber, Bad Ischl (AT);
Markus Weber, Bad Goisern (AT);
Ludwig Kain, Bad Goisern (AT)

(73) Assignee: SCHUNK CARBON TECHNOLOGY GMBH, Bad Goisern (AT)

( * ) Notice: Subject to any disclaimer, the term of this patent is extended or adjusted under 35 U.S.C. 154(b) by 223 days.

(21) Appl. No.: 18/268,904

(22) PCT Filed: Dec. 23, 2020

(86) PCT No.: PCT/EP2020/087799
§ 371 (c)(1),
(2) Date: Jun. 21, 2023

(87) PCT Pub. No.: WO2022/135715
PCT Pub. Date: Jun. 30, 2022

(65) Prior Publication Data
US 2024/0063695 A1     Feb. 22, 2024

(51) Int. Cl.
*H02K 13/00* (2006.01)
*H01R 39/26* (2006.01)
(Continued)

(52) U.S. Cl.
CPC ........... *H02K 13/003* (2013.01); *H01R 39/26* (2013.01); *H01R 39/38* (2013.01); *H01R 39/56* (2013.01); *H02K 11/40* (2016.01); *H02K 13/006* (2013.01)

(58) Field of Classification Search
CPC .... H02K 13/003; H02K 11/40; H02K 13/006; H02K 9/19; H02K 1/32; H02K 5/1675;
(Continued)

(56) References Cited

U.S. PATENT DOCUMENTS 2,548,631 A     4/1951   Stapleton
2,821,664 A     1/1958   Weaver et al.
(Continued)

FOREIGN PATENT DOCUMENTS

CN     103748476 A     4/2014
EP     1300927     *   4/2003
(Continued)

OTHER PUBLICATIONS

JP-02214442-A (Year: 1990).*
(Continued)

*Primary Examiner* — Ahmed Elnakib
(74) *Attorney, Agent, or Firm* — Quarles & Brady LLP

(57)     ABSTRACT

A discharge device for discharging electric currents from a rotor part of a machine, said rotor part having a shaft, the discharge device comprising an axially displaceable contact element, which is at least partly accommodated in a guide, for forming an electroconductive sliding contact between a sliding contact surface of the contact element and a shaft contact surface of the shaft, the sliding contact surface being provided for forming the sliding contact, the contact element being electroconductively connected to the guide and/or a retaining element of the machine, and the contact element being prestressed towards the shaft contact surface by means (Continued)

Figures 1, 2:
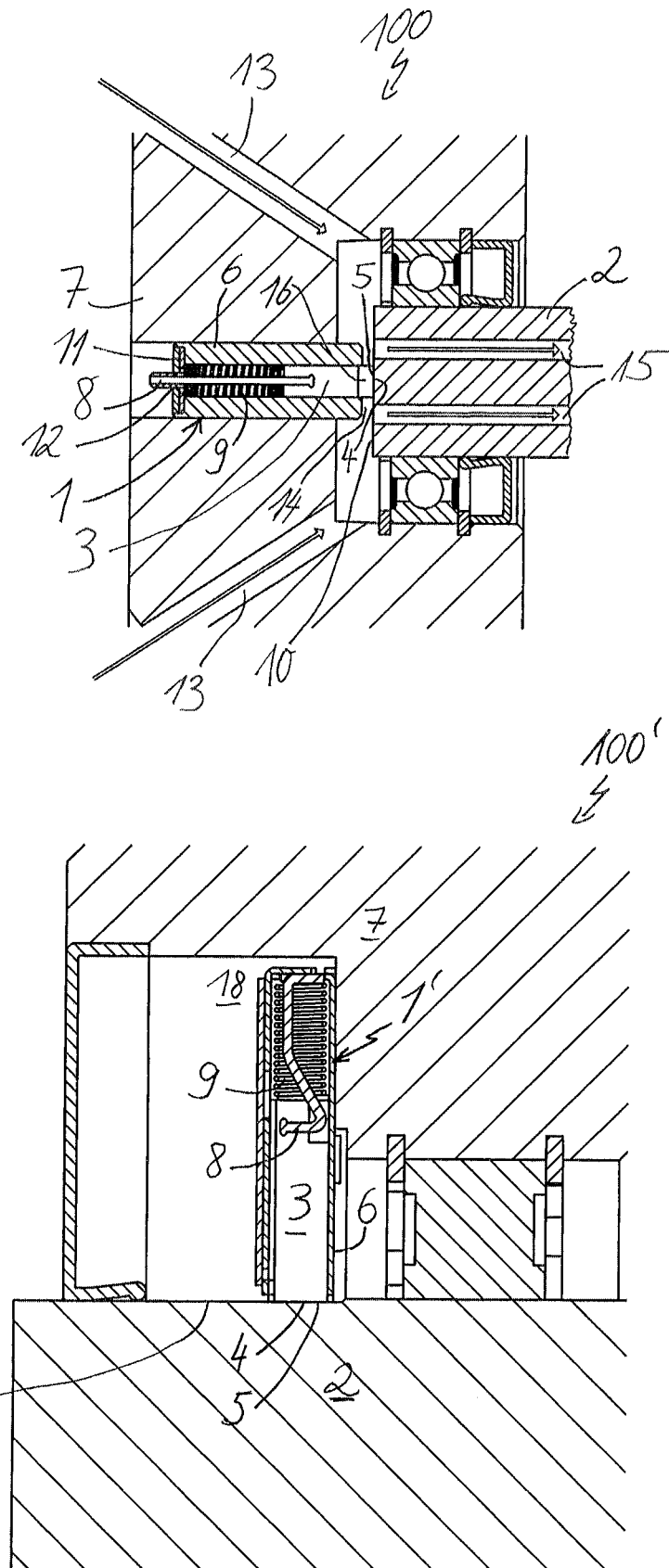

of a spring element, the contact element being at least partly wetted with an oily fluid, in particular at least in the area of its sliding contact surface.

15 Claims, 3 Drawing Sheets

(51) Int. Cl.

| | | |
|---|---|---|
| *H01R 39/38* | (2006.01) | |
| *H01R 39/56* | (2006.01) | |
| *H02K 11/40* | (2016.01) | |

(58) Field of Classification Search
    CPC .... H02K 2213/03; H02K 7/003; H01R 39/26;
             H01R 39/38; H01R 39/56; H01R 39/381;
             H01R 39/20; H01R 4/66; F16C 41/002
    USPC ........................................ 310/68 R, 239, 245
    See application file for complete search history.

(56) References Cited

U.S. PATENT DOCUMENTS

| | | | | | |
|---|---|---|---|---|---|
| 4,006,953 | A | † | 2/1977 | Moritoro | |
| 4,166,968 | A | * | 9/1979 | Prittie | H02K 5/148 |
| | | | | | 310/239 |
| 5,661,356 | A | † | 8/1997 | Fisher | |
| 8,847,463 | B2 | † | 9/2014 | Neuweger | |
| 2005/0046303 | A1 | * | 3/2005 | Richard | H02K 23/62 |
| | | | | | 310/239 |
| 2006/0232146 | A1 | * | 10/2006 | Bald | H02K 5/203 |
| | | | | | 310/52 |
| 2007/0201995 | A1 | | 8/2007 | Harstad et al. | |
| 2017/0256900 | A1 | † | 9/2017 | Li | |
| 2019/0081538 | A1 | * | 3/2019 | Nye | H01R 39/025 |

FOREIGN PATENT DOCUMENTS

| | | | | |
|---|---|---|---|---|
| EP | 1300927 | A | † | 4/2003 |
| EP | 1300927 | A1 | | 4/2003 |
| JP | 2015537350 | A | | 12/2015 |
| SU | 391670 | A1 | | 7/1973 |

OTHER PUBLICATIONS

International Search Report dated Sep. 23, 2021 in connection wth PCT/EP2020/087799, 6 pgs.

Japan Patent Office, Notice of Reasons for Refusal, Application No. 2023-536418, Nov. 20, 2024, 8 pages [English Language Translation Only].

Chinese Office Action, corresponding to related application CN 202111589029.4, dated Jan. 9, 2026.

* cited by examiner
† cited by third party

COLLECTION DEVICE FOR COLLECTING ELECTRICAL CURRENTS, AND MACHINE COMPRISING A COLLECTION DEVICE OF THIS KIND

The present application is a national stage application filed under 35 U.S.C. § 371 of International Application No. PCT/EP2020/087799, filed Dec. 23, 2020, which application is incorporated herein by reference in its entirety for all purposes.

The present disclosure relates to a discharge device for discharging electric currents from a rotor part of a machine, said rotor part having a shaft, the discharge device comprising an in particular axially displaceable contact element, which is at least partly accommodated in a guide, for forming an electroconductive sliding contact between a sliding contact surface of the contact element and a shaft contact surface of the shaft, the sliding contact surface being provided for forming the sliding contact, the contact element being electroconductively connected to the guide and/or a retaining element of the machine, and the contact element being prestressed towards the shaft contact surface by means of a spring element.

Different embodiments of discharge devices of this type are known from the state of the art. In particular, using carbon brushes, which are distributed axially or radially around a shaft and electrically connected to a stator via connecting wires, for discharging low-resistance currents is known. The carbon brushes, which are accommodated in a retaining element or brush holder in this case, allow a direct discharge of electric currents because of their low electric resistance and can thus prevent an undesired conducing of currents via bearing positions of the shaft, which could cause damage to the surface of the bearing bodies or bearing rings because of punctiform welding.

In the present disclosure, the term "shaft" is used as a synonym for the terms "rotor part" or "axle". Thus, the term "shaft" refers to all rotating machine parts from which currents can be discharged to a fixed stator part or machine part of a machine.

Discharge devices are also commonly used in railroad technology, where alternating currents or an operating current can flow off via wheel axles. Discharge devices of this type are described in DE 10 2010 039 847 A1, for example.

Electric machines in general, such as motor vehicles, require measures for discharging currents. With drive shafts or gear shafts or other functional components which are connected to said drive shafts, continuously fluctuating alternating voltages or currents and high-frequency current pulses can occur, which can also damage bearing positions of a rotor shaft or gear shaft, which is why discharge devices are typically necessary in this context.

A problem with the described discharge devices and the machines comprising such discharge devices is the high heat development caused by electrical and mechanical losses, which cause both the discharge device and the machine (e.g. motor, transmission) high amounts of thermal stress. To solve this problem to at least some degree, transporting the generated heat away has previously been achieved in particular by means of ventilators. However, such ventilators can minimize the thermal component stress only partly. Another disadvantage of such ventilators is the significant increase in installation space which is required to integrate such ventilators in the corresponding machines.

Therefore, the object of the present disclosure is to overcome the disadvantages known from the state of the art as described above. The object of the disclosure is, in particular, to minimize thermal component stress when discharging parasitic currents while keeping the required installation space as small as possible.

According to the disclosure, this object is attained by a discharge device of the make mentioned above, which is characterized in that the contact element is at least partly wetted with an oily fluid, in particular at least in the area of its sliding contact surface.

By means of the discharge device according to the disclosure, capacitively coupled high-frequency voltages (so-called parasitic alternating voltages), which are generated by electric drives because of the used power electronics (pulse width modulation), can be discharged in an ideal manner, and simultaneously, the heat generated in this context can be contained or discharged by means of the oily fluid. In particular, the present disclosure does not require a special cooling device, such as a ventilator, for minimizing the thermal stress. Thus, a machine, such as an electric motor, can have a simpler and thus more cost-effective design and the motor can be cooled more efficiently than in the case of known systems. For example, friction losses due to radial shaft seals do not apply either. Additionally, as already described above, the overall machine dimensions can be smaller (moment of inertia of the rotating parts decreases).

Generally, the oily fluid is a motor oil and/or gear oil, which is usually already present anyway in the motor or gear in which the discharge device according to the disclosure is provided.

In a particularly preferred embodiment of the discharge device according to the disclosure, the guide is electroconductively connectable to a stator part of the machine. This stator part of the machine can serve as a retaining element for the discharge device, for example. When the current is discharged, it is discharged from the respective shaft to the contact element and the guide of the discharge device. In the described embodiment, the discharged current then flows into the mentioned stator part of the machine.

Advantageously, the contact element is electroconductively connected to the guide by means of a preferably low-resistance stranded wire, the stranded wire preferably being pressed or stamped into the contact element on one end and preferably welded or soldered or crimped to the guide on the other end. The guide is preferably at least partly made of a low-resistance material, in particular metal, preferably aluminum, an aluminum alloy, copper and/or brass.

In a particularly preferred embodiment of the discharge device according to the disclosure, the contact element is essentially made of a carbon-metal mixture, in particular a mixture of graphite and a metal with high electric conductivity, silver preferably being provided as the metal at least in the area of the sliding contact surface of the contact element, and copper preferably being provided as the metal in a rearward area of the contact element, the contact element preferably being free from copper in the area of the sliding contact surface. The fraction of the metal in the contact element is preferably at least 30 percent by volume. The contact element is preferably free from copper in the area of the sliding contact surface because this metal can cause catalytic changes in the oily fluid when a current flows therethrough, which can negatively change the physical properties of this fluid as a consequence. For this reason, the shaft of the machine according to the disclosure, which is described in more detail below, is also free from copper, at least in the area in which the shaft establishes an electric contact with the contact element.

In order to keep a system resistance as low as possible under all operating conditions, the resistance of the discharge device according to the disclosure should also be selected to be low. By means of the embodiments described above using low-resistance materials and a contact element made of a metal-carbon mixture, the resistance of the whole device can be kept low. On the other hand, the system resistance is mainly influenced by the voltage drop between the shaft surface and the sliding contact surface of the contact element. This is the largest proportion in the overall system. Thus, it should also be kept low. To ensure this while a continuous oil supply is in place, a high specific contact pressure of the contact element on the shaft is advantageous. This value should be at least 10 N/cm². On the other hand, electrochemical reactions in connection with the oily fluid should not occur on the contact element in the area of the sliding contact surface. This is ensured in particular by a material made of silver and graphite in an area of the contact element which is subject to wear during the entire operating life.

Advantageously, the contact element has a recess, in particular a hole or a slit, in the area of the sliding contact surface. Thus, the contact can be prevented from floating on the oil film. Advantageously, the contact element is open-pored in the area of the sliding contact surface. This contributes to suppressing electrical contact losses between the shaft and the contact element and minimizes a floating of the contact element on the oil film.

Generally, the contact element is a pin-shaped or bolt-shaped brush. This brush is generally produced by compression molding and a subsequent thermal treatment.

Advantageously, the spring element is a helical compression spring which preferably abuts on the end face of the contact element opposite the sliding contact surface by means of one end. By means of a helical compression spring of this kind, it is easily possible to constantly press the contact element on the shaft with a specific intended contact pressure.

The present disclosure further relates to a machine, in particular an electric drive motor or a transmission, having a rotor part which has a shaft and having a discharge device according to any one of the claims 1 to 9, the contact element of the discharge device establishing an electric contact with the shaft by means of its sliding contact surface in order to form a sliding contact. The machine according to the disclosure has the above-described advantages of drastically reduced thermal stress while keeping the installation space small and having a simple design.

In the case of the machine according to the disclosure, the discharge device can be fully disposed in the oily fluid, in particular motor oil or gear oil. Preferably, the oily fluid is provided in particular in a space between the shaft and the guide which is bridged by the contact element. In this embodiment, in particular the place of the highest heat development, namely the area between the shaft and the contact element, is cooled by the oily fluid.

The discharge device can be disposed at least partly in a fluid guide, in particular an oil guide, the oily fluid preferably initially flowing into the space between the shaft and the guide and subsequently being discharged via the shaft. In this embodiment, the heat generated in the contact area between the shaft and the contact element can be transported away instantly by the flow of the oily fluid in the fluid guide.

Furthermore, it is conceivable that the oily fluid is sprayed on, drizzled on or applied in the form of a nebula to the discharge device, in particular the contact element of the discharge device.

In another embodiment of the machine according to the disclosure or the discharge device according to the disclosure, a line for the oily fluid is provided in the guide of the discharge device, the line preferably opening into the space between the shaft and the guide.

Advantageously, the contact element is constantly pressed on the shaft with a force of at least 10 N/cm² by means of the spring element. Thereby, a minimization of the voltage drop between the shaft surface and the sliding contact surface of the contact element is achieved.

As described above, the shaft is preferably essentially free from copper, at least in the area in which it is electronically connected with the contact element.

In a preferred embodiment of the machine according to the disclosure, the contact element establishes an electric contact with an end surface of the shaft, the contact element preferably being disposed essentially coaxially to the shaft. A shaft grounding of this type is preferred for avoiding contact losses because the axial run-out of the rotating shaft is usually small. By positioning the contact element close to the rotation point of the shaft, the circumferential speeds are minimized and thus the running distance actually seen during the operating life of the contact element is enormously reduced. This directly influences the wear of the contact element, which generally correlates proportionally to the running distance. By minimizing the running distance, the wear of the contact element stays small, whereby, as a result, the loss of strength of the spring element over the total wear length of the contact element is also minimal. This allows the use of a more cost-effective helical compression spring as described above, for example. In addition, the low circumferential speed close to the rotational axis of the shaft decreases the risk of the forming of a continuous, electrically insulating lubrication film, whereby the clamping force can be kept lower than it would be necessary with a high circumferential speed. Another advantage of establishing an end-face electric contact with the shaft close to the rotational axis is the minimization of the moment of friction due to the short radial distance from the rotation point. Even with a very large friction force, the moment of friction as a product of friction force×running radius stays small. Therefore, also in connection with the angular velocity (equivalent to rotational speed), the frictional power subsequently stays low and thus the system losses stay small.

In a further embodiment of the machine according to the disclosure, the contact element establishes an electric contact with the circumferential surface of the shaft. In this embodiment, the cross section of the contact element is geometrically tapered, preferably against the preferred rotation direction of the shaft to be electronically connected, in order to achieve a suppressing of electrical contact losses caused by floating between the shaft and the contact element.

Generally, the discharge device is positioned in a section of the machine in which primarily an operating temperature of higher than 50° C. prevails.

Further features of the disclosure can be derived from the following description of figures in connection with the drawings and the dependent claims. The individual features can be realized on their own or in combination with each other.

Figure 3:
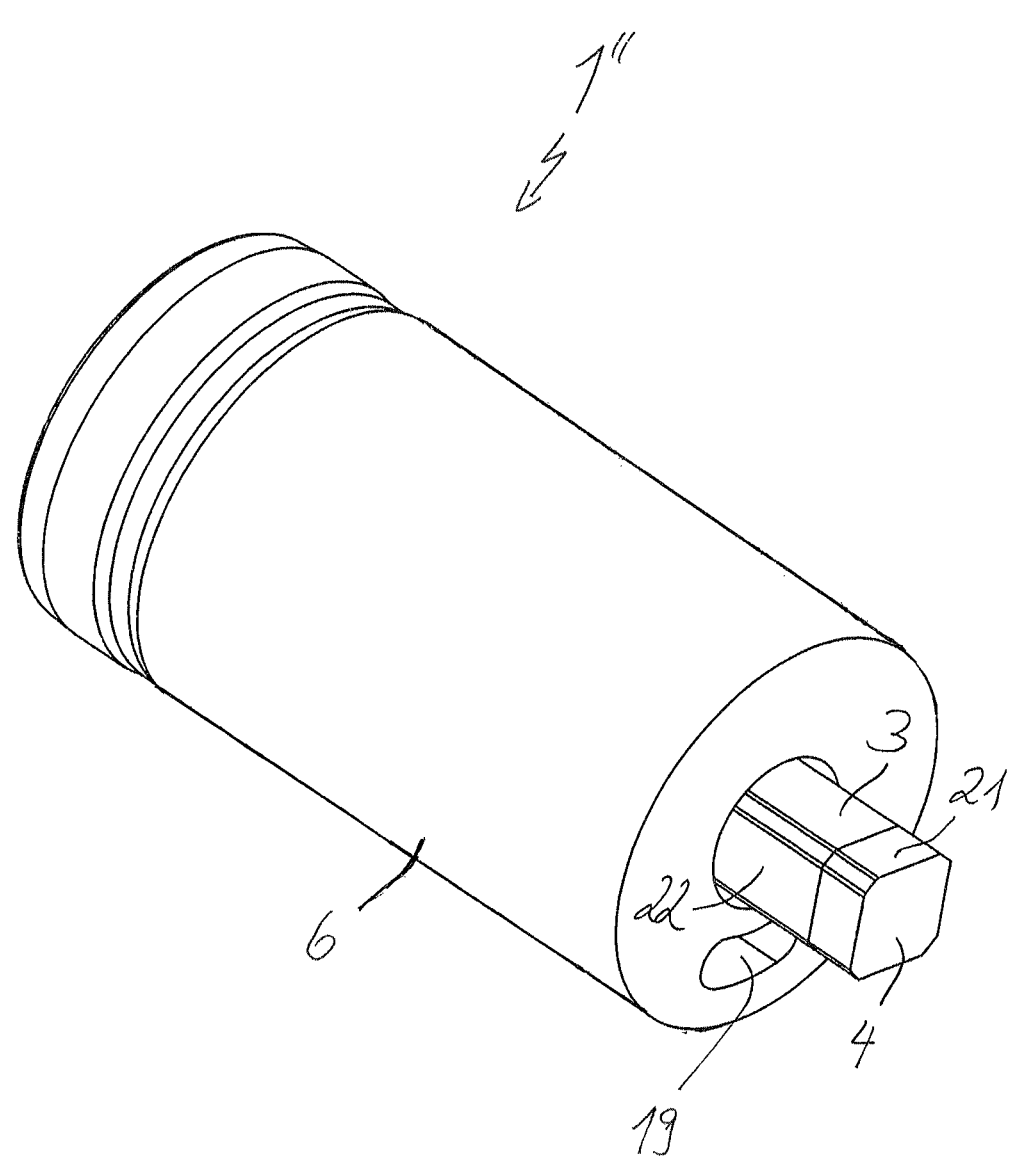
Figure 4:
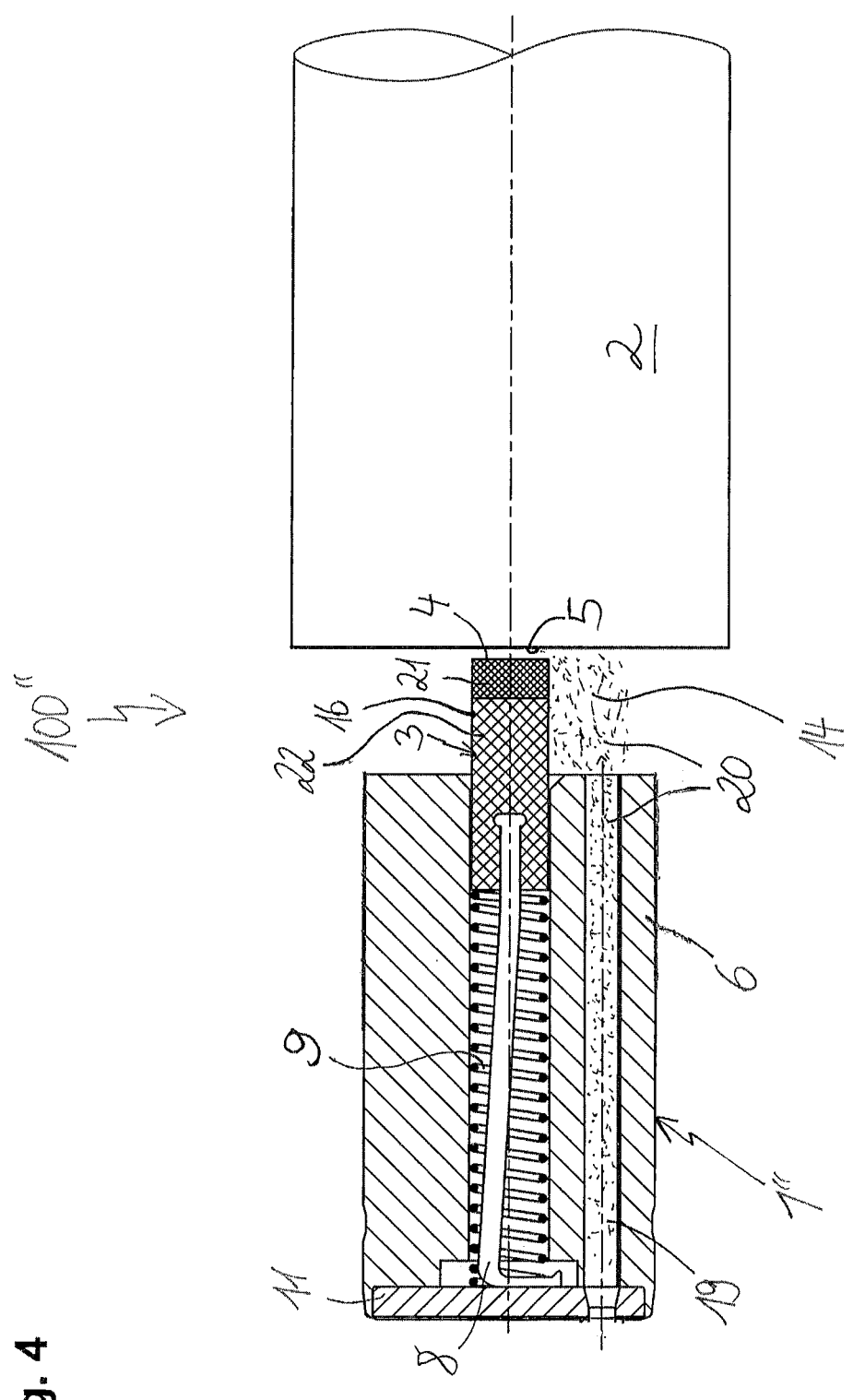

In the figures:

FIG. 1: shows a section of a machine according to the disclosure in the contact area between the contact element and the shaft in longitudinal section, the contact element being disposed coaxially to the shaft;

FIG. 2: shows a section of another embodiment of a machine according to the disclosure in the contact area between the contact element and the shaft in longitudinal section, the contact element being disposed radially to the shaft;

FIG. 3: shows an embodiment of a discharge device according to the disclosure;

FIG. 4: shows a longitudinal section through the discharge device of FIG. 3.

In the following, the same elements or elements having the same function are marked with the same reference numeral.

FIG. 1 shows a section of a machine 100 according to the disclosure in longitudinal section. In this case, machine 100 is an electric motor which has a rotor part having a shaft 2. A discharge device 1 for discharging electric currents is disposed on an end face 10 of shaft 2. The discharge device comprises a contact element in the form of a carbon brush 3 for forming an electroconductive sliding contact between sliding contact surface 4 of carbon brush 3 and a shaft contact surface 5 of shaft 2, sliding contact surface 4 being provided for forming the sliding contact. Carbon brush 3 is accommodated in a guide 6 so as to be axially displaceable. Guide 6 is a cylindrical housing and is located in a recess, which is also cylindrical, in a retaining element 7 of machine 100. Carbon brush 3 is electroconductively connected to retaining element 7 by means of a stranded wire 8.

Carbon brush 3 is prestressed towards shaft contact surface 5 by means of a helical compression spring 9. Thus, carbon brush 3 is subject to a contact force by means of spring 9 for forming an electroconductive sliding contact between sliding contact surface 4 of carbon brush 3 and axial shaft contact surface 5 of shaft 2, sliding contact surface 4 being provided for forming the sliding contact. On the side of guide 6 which faces shaft 2, carbon brush 3 somewhat protrudes out of guide 6 and establishes an electric contact with shaft 2 on its end face 10. In this case, carbon brush 3 is essentially positioned so as to be centered with respect to end face 10 of shaft 2 and is thus coaxially disposed to the shaft. As already described above, this setting is especially advantageous because it allows the smallest possible amount of wear on carbon brush 3.

On the other end of guide 6, it has a lid 11 which has a centered recess 12 which is penetrated by stranded wire 8. Spring 9 is disposed between lid 11 and carbon brush 3 and prestresses carbon brush 3 towards shaft 2.

Two oil-conducting channels 13 are provided in retaining element 7 of machine 100. These oil-conducting channels 13 are disposed above and below shaft 2, respectively, and initially run towards it at an angle. According to the arrows illustrated in FIG. 1, motor oil flows towards shaft 2 and enters space 14 between shaft 2 and guide 6 via oil-conducting channels 13, space 14 being bridged by front end area 16 of carbon brush 3. Thus, carbon brush 3 is wetted with oil in this area. In this process, oil also gets on sliding contact surface 4 and shaft contact surface 5. This "oiling" of carbon brush 3 and shaft 2 allows an ideal cooling in this area. From space 14, the heated oil flows on to two channels 15 which are disposed in shaft 2 and which are disposed parallel to the longitudinal axis of the shaft. Thus, the heat is basically transported away from carbon brush 3 via channels 15.

It is obvious that the wetting of carbon brush 3 could also be achieved in a different way. For example, it is possible that oil is drizzled on or oil vapor is applied to the carbon brush, especially in the contact area to the shaft. It is also conceivable that oil completely surrounds the entire machine, in particular in the contact area between shaft 2 and carbon brush 3.

Guide 6 and retaining element 7 are made of an electroconductive metal, such that guide 6 and retaining element 7 are electroconductively connected. In the exemplary embodiment at hand, guide 6 is made of aluminum.

Stranded wire 8 is also made of a low-resistance material. Stranded wire 8 is pressed into carbon brush 3 on one end and connected to retaining element 7 on its other end by means of crimping.

Carbon brush 3 has a two-layered structure. In the area of sliding contact surface 4, carbon brush 3 is made of a mixture of graphite and silver. This applies in particular to section 16 of carbon brush 3 which bridges space 14. The silver content in this part is approx. 3 percent by volume. The remaining part of carbon brush 3 is made of a mixture of graphite and copper. However, section 16 of carbon brush 3 and shaft 2 are essentially free from copper in order to prevent undesired reactions with the oil.

Carbon brush 3 is a cylindrical pin. In the exemplary embodiment at hand, carbon brush 3 is pressed on shaft 2 with a force of approx. 10 N/cm$^2$.

FIG. 2 shows a longitudinal section of another embodiment of a machine 100' according to the disclosure. The main difference to machine 100 of FIG. 1 is that in this case, discharge device 1' is disposed radially to shaft 2, such that carbon brush 3 establishes an electric contact to circumferential surface 17 of shaft 2. Additionally, stranded wire 8 is connected to guide 6, such that in this case, stranded wire 8 acts as an electric line between carbon brush 3 and guide 6. In this embodiment, discharge device 1' is also disposed in a retaining element 7 of machine 100'. Here, discharge device 1' is disposed in a space 18 which is part of an oil guide. Thus, discharge device 1' is constantly in contact with oil. Therefore, the thermal stress on the individual components, such as shaft 2 and carbon brush 3, can be kept low in this embodiment, as well. Here, too, the resulting heat is transferred to the oil during the discharge process.

FIG. 3 shows another embodiment of a discharge device 1" according to the disclosure, FIG. 4 showing said discharge device 1" in another embodiment of a machine 100" according to the disclosure. Machine 100" and discharge device 1" differ from the embodiments illustrated in FIGS. 1 and 2 in particular in that an oil line 19 is provided in guide 6, said oil line 19 extending from lid 11 in an axial direction to space 14 between guide 6 and shaft 2 and being openly connected to said space 14. As can be seen in FIG. 4, oil 20 flows from the area of lid 11 towards space 14 and pours out into it. Thereby, bridging section 16 of carbon brush 3 is flushed with oil. In FIG. 4, the two-layered design of carbon brush 3 can be seen clearly. In a front area 21, the carbon brush is made of a mixture of graphite and silver. In a rearward area 22, the carbon brush is made of a mixture of graphite and copper. In this case, stranded wire 8 is electrically connected to rearward area 22 of carbon brush 3 and guide 6 and electroconductively connects these elements.

The invention claimed is:

1. A discharge device for discharging electric currents from a rotor part of a machine, said rotor part having a shaft, the discharge device comprising a displaceable contact element, which is at least partly accommodated in a guide, for forming an electroconductive sliding contact between a sliding contact surface of the contact element and a shaft contact surface of the shaft, the sliding contact surface being provided for forming the sliding contact, the contact element being electroconductively connected to the guide and/or a retaining element of the machine, and the contact element being prestressed towards the shaft contact surface by means of a spring element, wherein the contact element is at least partly wetted with an oily fluid, at least in the area of its sliding contact surface, and wherein the contact element is essentially made of a carbon-metal mixture, namely a mixture of graphite and metal, the total volume fraction of the metal being at least 30 percent by volume, silver being provided as the metal at least in a front area of the contact element, said front area having the sliding contact surface, and copper being provided as the metal in a rearward area of the contact element, the contact element being free from copper in the area of the sliding contact surface.

2. The discharge device according to claim 1, wherein the oily fluid is motor oil and/or gear oil.

3. The discharge device according to claim 1, wherein the guide being electroconductively connected to a stator part of the machine.

4. The discharge device according to claim 1, wherein the contact element is electroconductively connected to the guide or a retaining element of the machine by means of a low-resistance stranded wire, the stranded wire being pressed or stamped into the contact element on one end and welded or soldered or crimped to the guide on the other end.

5. The discharge device according to claim 1, wherein the guide is at least partly made of a low-resistance material.

6. The discharge device according to claim 1, wherein the contact element has a recess in the area of the sliding contact surface, the contact element being open-pored in the area of the sliding contact surface.

7. The discharge device according to claim 1, wherein the contact element is a pin-shaped or bolt-shaped brush, the sliding contact surface being rectangular or circular.

8. The discharge device according to claim 1, wherein the spring element is a helical compression spring which abuts on the end face of the contact element opposite the sliding contact surface by means of one end.

9. A machine having a rotor part which has a shaft and having a discharge device, the discharge device comprising a displaceable contact element, which is at least partly accommodated in a guide, for forming an electroconductive sliding contact between a sliding contact surface of the contact element and a shaft contact surface of the shaft, the sliding contact surface being provided for forming the sliding contact, the contact element being electroconductively connected to the guide and/or a retaining element of the machine, and the contact element being prestressed towards the shaft contact surface by means of a spring element, wherein the contact element is at least partly wetted with an oily fluid, wherein the contact element of the discharge device establishing an electric contact with the shaft by means of its sliding contact surface in order to form a sliding contact, and wherein the discharge device is disposed at least partly in a fluid guide, the oily fluid initially flowing into the space between the shaft and the guide and subsequently being discharged via the shaft.

10. The machine according to claim 9, wherein oily fluid is provided at least in a space between the shaft and the guide which is bridged by the contact element.

11. The machine according to claim 9, wherein a line for the oily fluid, which opens into the space between the shaft and the guide, is provided in the guide.

12. The machine according to claim 9, wherein the contact element is constantly pressed on the shaft with a force of at least 10 N/cm$^2$ by means of the spring element.

13. The machine according to claim 9, wherein the shaft is essentially free from copper, at least in the area in which it is electrically connected with the contact element.

14. The machine according to claim 9, wherein the contact element establishes an electric contact with an end surface of the shaft, the contact element being disposed essentially coaxially to the shaft.

15. The machine according to claim 9, wherein the contact element establishes an electric contact with the circumferential surface of the shaft.

\*   \*   \*   \*   \*